United States Patent [19]

Collier et al.

[11] Patent Number: 5,039,930
[45] Date of Patent: Aug. 13, 1991

[54] BATTERY BOOSTER

[75] Inventors: Edward J. Collier, Anaheim; George H. Freuler, Morena Valley, both of Calif.

[73] Assignee: G&E Test Technologies, Inc., Yorba Linda, Calif.

[21] Appl. No.: 449,277

[22] Filed: Dec. 11, 1989

[51] Int. Cl.⁵ .................. H02J 7/10; H01M 10/46
[52] U.S. Cl. ........................ 320/2; 320/56; 320/61; 307/150
[58] Field of Search .......... 320/2, 56, 61; 307/66, 307/150

[56] References Cited

U.S. PATENT DOCUMENTS

| | | | |
|---|---|---|---|
| 2,659,042 | 11/1953 | Anderson et al. | 320/2 |
| 2,919,353 | 12/1959 | Paradise | 320/2 X |
| 4,161,682 | 7/1979 | Corvette | 320/2 |
| 4,209,346 | 6/1980 | King | 320/2 |
| 4,215,306 | 7/1980 | Mace | 320/2 |
| 4,675,538 | 6/1987 | Epstein | 307/66 X |
| 4,742,291 | 5/1988 | Bobier et al. | 307/66 X |
| 4,942,723 | 7/1990 | Wassell | 320/61 X |

FOREIGN PATENT DOCUMENTS 0070748 5/1982 Japan ......................... 136/293

OTHER PUBLICATIONS

"Battery Charger Uses Solar Power", *Electronics* Magazine, 2/1974.

*Primary Examiner*—R. J. Hickey
*Attorney, Agent, or Firm*—Gordon L. Peterson; Loyal M. Hanson

[57] ABSTRACT

A battery booster apparatus includes a portable support structure on which are mounted a battery, jumper cables for connecting the battery in parallel with an external battery that is in a low charge condition, an AC-powered charger for charging the battery, and a solar panel for charging the battery when the charger is not powered. The apparatus may include components for switching between the charger and the solar panel so that the solar panel is connected to the battery when the charger is not powered and disconnected when the charger is powered. The switching components may operate automatically and include a relay electrically connected to the charger so that the relay operates when the charger is powered.

7 Claims, 1 Drawing Sheet

BATTERY BOOSTER

BACKGROUND OF THE INVENTION

1. Technical Field

This invention relates generally to automotive equipment, and more particularly to a battery booster suitable for boosting the batteries in fleets or inventories of automobiles that remain idle for extended periods.

2. Background Information

When automobiles remain idle for extended periods their can run down to a low charge condition too weak to start the engine. If that happens, a car lot attendant often connects a battery booster in parallel with the automobile battery to supply the extra power needed. After starting the engine, he disconnects the battery booster for storage until it is needed again. But sometimes the attendant leaves the battery booster in the car lot instead of returning it to an appropriate storage location and that can cause a problem.

To see why, recall that the battery booster includes a battery also, typically a 12-volt battery for boosting 12-volt automotive batteries. Sometimes called a host battery, it usually adjoins an AC-powered charger on some sort of portable cart. After using the battery booster, the attendant is supposed to move it to the storage location and plug it into a conventional 110-volt AC source so that the charger can keep the host battery fully charged.

Leaving the battery booster in the car lot, however, leaves the charger unplugged from the AC source. Then the unpowered charger does not charge the host battery and the host battery eventually loses much of its charge. That essentially ruins battery booster usefulness because the attendant must first recharge the host battery before using the battery booster and he could just as well charge the run down automobile battery instead. So, some way is needed to overcome the problem.

SUMMARY OF THE INVENTION

This invention solves the problem outlined above by providing a battery booster that has a solar panel connected as a secondary charger. The solar panel provides a trickle charge to the host battery as long as there is sufficient light. Thus, the host battery remains at full charge despite extended periods of charger disconnection from an AC source.

Generally, a battery booster constructed according to the invention includes a portable support structure, a battery on the portable support structure, and means for connecting the host battery in parallel with an external battery that is in a low charge condition (i.e., a run down battery). An AC-powered charger is included on the portable support structure for charging the battery. According to a major aspect of the invention, a solar panel is also included on the portable support structure for charging the battery when the charger is not powered.

The battery booster may also include means for switching between the charger and the solar panel so that the solar panel is connected to the battery when the charger is not powered and disconnected from the battery when the charger is powered. In addition, the switching means may be configured to switch between the charger and the solar panel automatically, one embodiment including a relay that is electrically connected to the charger so that the relay operates to disconnect the solar panel from the battery when the charger is powered.

In line with the foregoing, a method of maintaining a charge on the battery in a battery booster includes the step of providing a solar panel mounted on the battery booster. The method proceeds by switching between the charger and the solar panel so that the solar panel is connected to the battery for charging purposes when the charger is not powered and disconnected from the battery when the charger is powered. Preferably, the step of switching is performed automatically.

DESCRIPTION OF THE PREFERRED EMBODIMENTS

Figure 1:
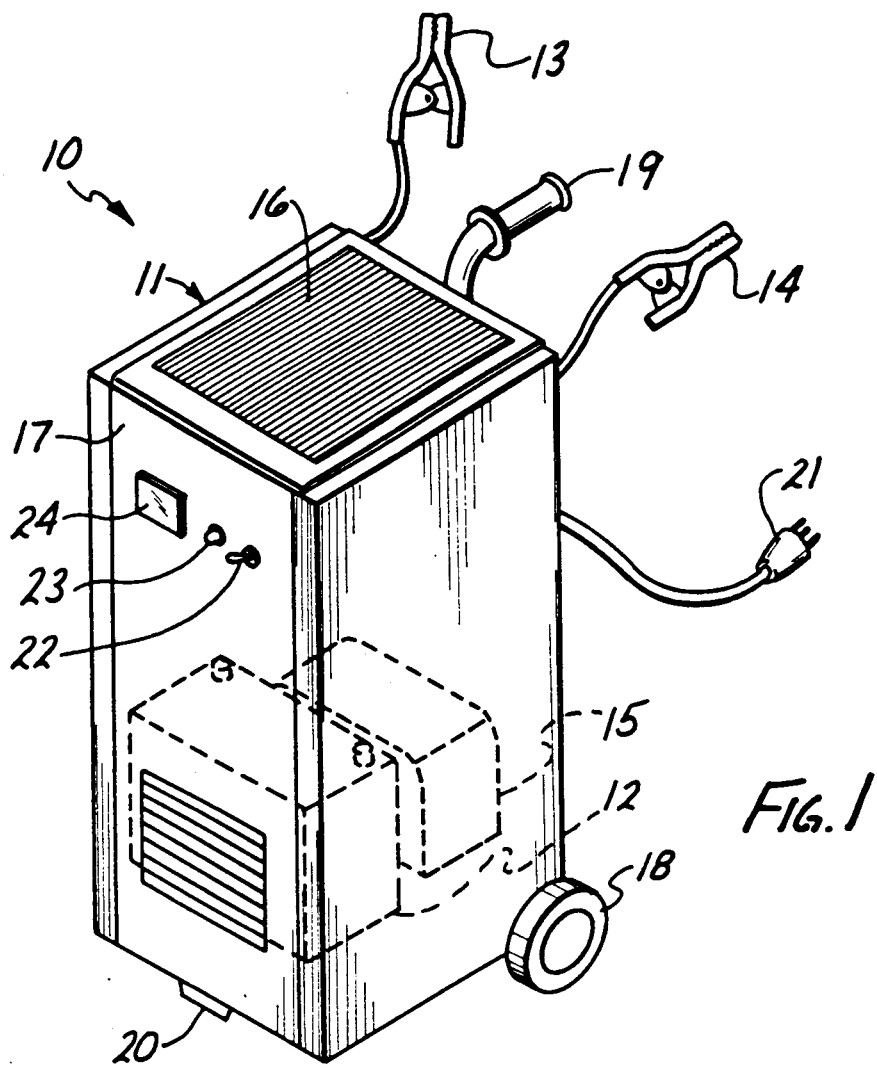
FIG. 1 of the drawings is a perspective view of a battery booster constructed according to the invention.

The drawings show a battery booster 10 constructed according to the invention. Generally, it includes a portable support structure or cart 11 (FIG. 1) and a host battery 12 on the cart 11, jumper cables 13 and 14 on the cart 11 functioning as means for connecting the battery 12 in parallel with an external battery that is in a low charge condition (not shown). An AC-powered charger 15 is provided on the cart 11 to charge the battery 12 and a solar panel 16 is included to charge the battery 12 when the charger 15 is not powered.

A battery booster constructed according to the invention may employ any of various forms of portable support structure that can support the other components and be transported to the location of a run down battery that needs a boost, such as the battery in an automobile that has been standing idle for a long period of time. For those purposes, the illustrated battery booster 10 includes the cart 11 which takes the form of a metal cabinet 17 mounted on two wheels 18 something like a dolly, only one of the wheels 18 being visible in FIG. 1. The user grasps a handle 19 attached to the cabinet 17 and tilts the cabinet 17 toward the handle 19 slightly so that the cabinet 17 lifts off of a forward leg 20 and is riding only on the wheels 18. Then the user wheels the battery booster 10 to the location of the external battery where he allows the cabinet 17 to pivot forward and back onto the leg 20.

In order to move the battery booster 10, the user may first have to unplug a conventional line-cord-and-plug combination or line cord 21 that is part of the charger 15 and provided for purposes of coupling the charger 15 to an AC source, such as by plugging it into a conventional 110-volt AC outlet. Before unplugging the charger 15 so that it is unpowered, however, the user preferably turns the charger 15 off using a switch 22 on a front panel portion of the cabinet 17 while viewing an indicator lamp 23 that is also mounted on the front panel portion of the cabinet 17. When the charger 15 is unpowered, the lamp 23 extinguishes as subsequently described with reference to the schematic circuit diagram in FIG. 2.

Once the user has moved the battery booster 10 to the run down battery, the jumper cables 13 and 14 are clamped in a conventional manner onto the battery posts of the run down battery, the jumper cables 13 and 14 being configured conventionally using large clamps on 8 guage cabling. Of course, suitable known means other than jumper cables may be employed for connecting the host battery 12 to a run down battery and the connection need not be direct. It may be to any convenient connection point electrically connected to the run down battery, such as an accessible terminal on starter circuitry.

With the battery booster 10 so connected, the user views a meter 24 adjacent the indicator lamp 23 in order to verify that a charging current is flowing to the run down battery. When the charge of the run down battery is complete, the user disconnects the jumper cables 13 and 14 from the run down battery and returns the battery booster 10 to a storage location where the charger 15 can be plugged back into the AC outlet. After doing that, the user turns the switch 22 on so that the charger 15 is again powered, the indicator lamp 23 is again lit, and the host battery 12 is again provided with a charging current to keep it a full charge.

If the user fails to return the battery booster 10 to the storage location or otherwise fails to cause the charger 15 to be powered, the solar panel 16 operates to provide a charging current to the host battery 12. Of course, there must be sufficient light for that purpose, but that is often the case in a car lot environment. Even under overcast and low light conditions, the high efficiency 12-volt solar panel atop the cabinet 17 supplies a trickle charge sufficient to maintain a charge on the host battery 12.

Figure 2:
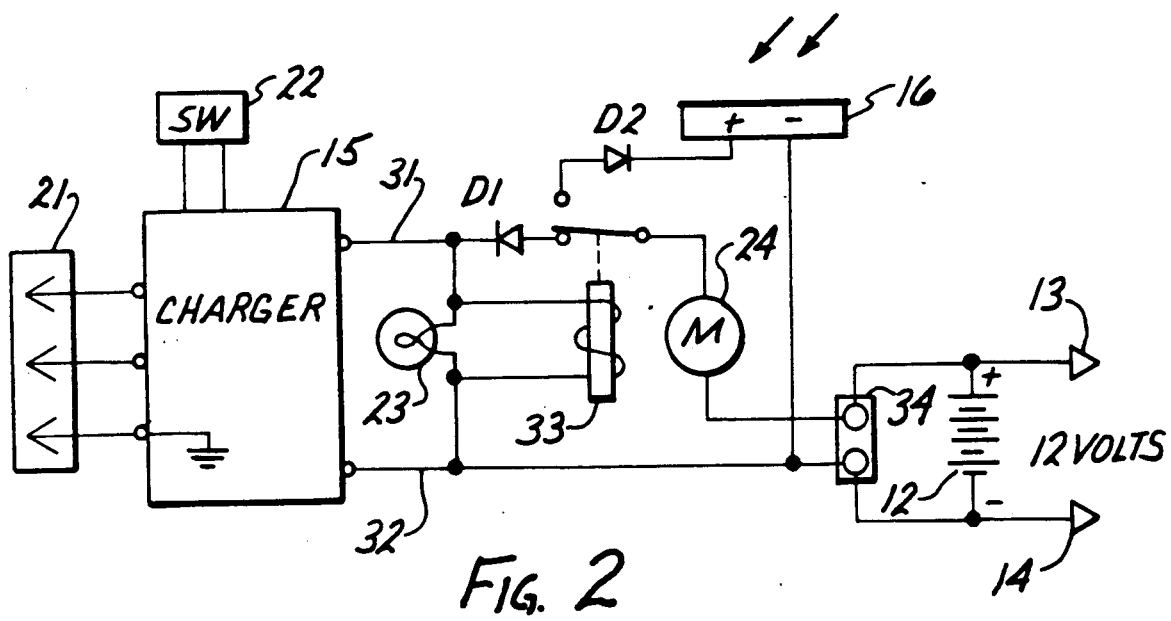
FIG. 2 is a schematic circuit diagram of the electrical circuitry used in the battery booster.

FIG. 2 shows the manner in which the electrical components are interconnected. The line cord 21 is electrically connected to the charger 15 so that when the line cord 21 is plugged into a conventional 120 V.A.C outlet, it couples 20 V.A.C. to the charger 15. The charger 15 may be a commercially available unit such as the 12-volt, 6-amp, automatic battery charger designated BR-512 that is available from the Schauer Company, and the output (a 12-volt charging current of up to 6-amperes) is coupled by lines 31 and 32 in the schematic circuit diagram of FIG. 2 to switching circuitry preceding the host battery 12.

The invention includes means for switching between the charger 15 and the solar panel 16. Preferably, the means for switching between the charger 15 and the solar panel 16 is configured to switch between the charger 15 and the solar panel 16 automatically. Preferably, it switches between a first state in which the charger 15 is powered (the state illustrated in FIG. 2) and a second state in which the charger 15 is not powered. In the first state, the charger 15 is connected to the host battery 12 and the solar panel 16 is disconnected from the host battery 12, while in the second state the charger 15 is disconnected from the host battery 12 and the solar panel 16 is connected to the host battery 12.

Those things are accomplished in the battery booster 10 with a 12-volt, 300 ohm relay 33 connected as shown in FIG. 2 &:o the lines 31 and 32 and thereby the 12-volt output of the charger 15, in parallel with the 12-volt indicator lamp 23 (e.g., a 12-volt incandescent lamp and surge resistor combination). With that arrangement, the lamp 23 functions when the charger 15 is powered to indicate the power-on condition, and the relay 33 functions to switch from the solar panel 16 to the charger 15 (the first state), disconnecting the solar panel 16 from the host battery 12 and connecting the charger 15. When the charger 15 is unpowered, the relay 33 functions to switch from the charger 15 back to the solar panel 16 (the second state), disconnecting the charger 15 from &:he host battery 12 and connecting the charger 15.

A battery booster constructed according to the invention may employ any of various known solar panels or their functional equivalent, and it may be mounted on the cabinet 17 by suitable known means such as screws so that it faces a source of light energy, preferably facing upwardly toward the sky so that solar energy impinges upon it as depicted by the arrows in FIG. 2. The battery booster 10, however, includes a known, commercially available, high efficiency, 12-volt solar panel, such as the solar panel designated the ARCO G100 that is available from the Arco Company. In addition, the battery booster 10 includes overcharge protection provided by diodes D1 and D2 (iN4002 power diodes or equivalent) and an indication of charging current provided by the 0–8 amp meter 24. A two pole terminal strip 34 facilitates connection and disconnection of the host battery 12, which may be rated at 12-volt, 640 amp/hr or more.

Thus, the invention provides a battery booster that has a solar panel connected as a secondary charger. The solar panel provides a trickle charge to the host battery as long as there is sufficient light and that serves to keep the host battery at full charge despite extended periods of charger disconnection from an AC source.

We claim:

1. A battery booster apparatus for use in automobile storage lots or the like, comprising:
   a) a portable support arranged to be moved between a storage location at which a power outlet is available, and a usage location where substantial ambient light is present but a power outlet is not conveniently available;
   b) a booster battery supported by said support;
   c) a battery charger supported by said support;
   d) means for connecting said battery charger to said power outlet when said support is at said storage location, said charger being operable to charge said booster battery when so connected;
   e) a solar panel on said support positioned to generate electricity when said support is exposed to said ambient light, said solar panel being operable to charge said booster battery when so exposed;
   f) means for electrically connecting said booster battery in parallel with a battery to be boosted; and
   g) switching means for automatically connecting said booster battery only to said charger when said charger is operative to charge said booster battery and only to said solar panel when it is not.

2. An apparatus as recited in claim 1, wherein said switching means include a relay that is electrically connected to said charger so that the relay operates to disconnect said solar panel from said booster battery when said charger is powered.

3. An apparatus as recited in claim 1, wherein the means for connecting said booster battery in parallel with said battery to be boosted includes jumper cables electrically connected to said booster battery.

4. An apparatus as recited in claim 1, wherein the solar panel is mounted atop the portable support structure.

5. A method of maintaining a charge on a booster battery in a battery booster including a charger adapted to be selectively connected to a power outlet, comprising:

providing a solar panel mounted on the battery booster; and switching between said charger and said solar panel so that said solar panel is connected to said booster battery for charging purposes when said charger does not put out a charge and physically disconnected from said booster battery when the charger is putting out a charge.

6. A method as recited in claim 5, wherein the step of switching between the charger and the solar panel is performed automatically.

7. An apparatus as recited in claim 1, wherein said portable support structure is a booster battery cart.

* * * * *